(12) United States Patent
Asati et al.

(10) Patent No.: US 8,976,807 B2
(45) Date of Patent: Mar. 10, 2015

(54) DYNAMICALLY DETERMINING HOSTNAMES OF NETWORK DEVICES

(75) Inventors: Rajiv Asati, Morrisville, NC (US); Ralph Droms, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 360 days.

(21) Appl. No.: 13/155,358

(22) Filed: Jun. 7, 2011

(65) Prior Publication Data

US 2012/0314624 A1 Dec. 13, 2012

(51) Int. Cl.
*H04J 3/00* (2006.01)
*H04L 29/12* (2006.01)

(52) U.S. Cl.
CPC ........ *H04L 61/1511* (2013.01); *H04L 61/2076* (2013.01); *H04L 61/2092* (2013.01); *H04L 61/2015* (2013.01)
USPC ......................................................... 370/464

(58) Field of Classification Search
USPC ................................. 370/464–545
See application file for complete search history.

(56) References Cited

U.S. PATENT DOCUMENTS

| | | | |
|---|---|---|---|
| 7,388,829 B2 * | 6/2008 | Sivakumar et al. | 370/218 |
| 7,529,926 B2 * | 5/2009 | Oishi | 713/156 |
| 7,710,967 B2 * | 5/2010 | Popoviciu et al. | 370/392 |
| 7,756,984 B2 * | 7/2010 | Burr et al. | 709/228 |
| 7,853,721 B2 * | 12/2010 | Awadallah et al. | 709/245 |
| 8,209,748 B1 * | 6/2012 | Nordstrom et al. | 726/13 |
| 2006/0104226 A1 * | 5/2006 | Ahn | 370/315 |
| 2006/0215654 A1 * | 9/2006 | Sivakumar et al. | 370/389 |
| 2008/0052758 A1 * | 2/2008 | Byrnes | 726/1 |
| 2011/0202670 A1 * | 8/2011 | Zheng | 709/228 |
| 2012/0179790 A1 * | 7/2012 | Kim et al. | 709/220 |
| 2012/0311693 A1 * | 12/2012 | Horman et al. | 726/14 |

\* cited by examiner

*Primary Examiner* — Fan Ng

(74) *Attorney, Agent, or Firm* — Hickman Palermo Truong Becker Bingham Wong LLP

(57) ABSTRACT

Techniques are disclosed for dynamically determining or learning hostnames. According to embodiments described herein, a solicitation message is received at a first network device. Based on the solicitation message, a hostname is determined for a second network device that sent the solicitation message. A first network address is also determined for the second network device that sent the solicitation message. A mapping between the hostname and the first network address is stored at the first network device.

17 Claims, 6 Drawing Sheets

US 8,976,807 B2

DYNAMICALLY DETERMINING HOSTNAMES OF NETWORK DEVICES

TECHNICAL FIELD

The present disclosure generally relates to data communications networks and, more specifically, to dynamically determining hostnames of network devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol version 6 (IPv6) is a version of the Internet Protocol developed by the Internet Engineering Task Force (IETF) that is designed to replace Internet Protocol version 4 (IPv4). IPv6 includes many key enhancements to the Internet Protocol, including a much larger address space and improved routing protocols. Another distinguishing feature of IPv6 is Stateless Address Autoconfiguration (SLAAC).

SLAAC, which is defined by Request for Comments (RFC) 4862 of the IETF, is a distributed address assignment process that enables network hosts to automatically configure their interfaces when connected to an IPv6 network. Typically, the assignment mechanism involves a host automatically generating an address for itself, verifying the uniqueness of the address, and assigning the address to one of its interfaces. Thus, SLAAC allows hosts to generate and assign their own IPv6 addresses with minimal configuration of routers and without manual configuration or additional servers.

Many network operators prefer SLAAC to other configuration protocols, such as Dynamic Host Configuration Protocol version 6 (DHCPv6), because of its simplicity and scalability. SLAAC does not require centralized configuration servers for address assignment, which reduces network overhead. Furthermore, SLAAC is ubiquitously supported by many current host operating systems (OSes), whereas many host OSes still do not support other configuration protocols, such as DHCPv6.

Despite SLAAC's benefits, some network operators still rely on stateful configuration servers for host configuration because network operators and service providers are currently unable to track hostnames through SLAAC. As many network operators prefer using hostnames instead of IPv6 addresses to manage network devices, the use of SLAAC becomes prohibitive.

DETAILED DESCRIPTION

Figure 1:
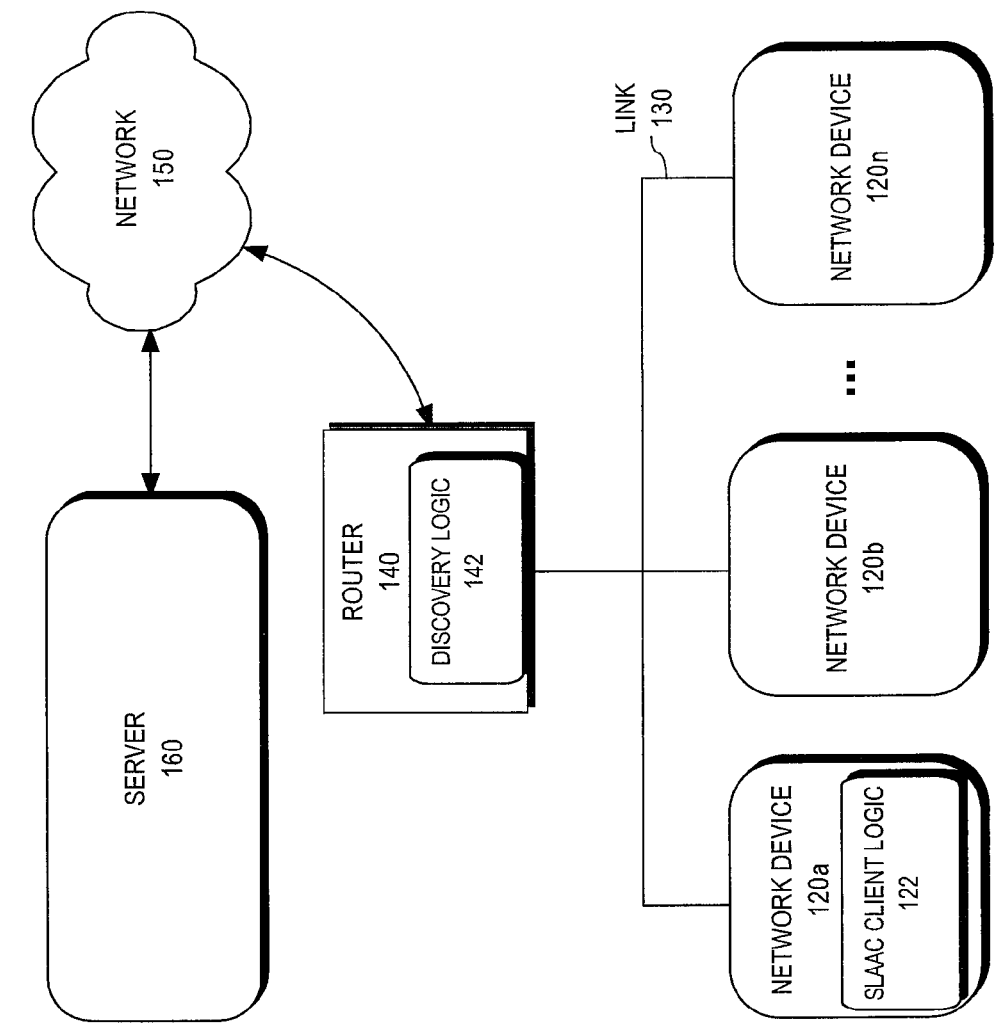
FIG. 1 illustrates a typical network arrangement on which an embodiment may be implemented.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Dynamic Ho stname Learning in a Stateless Configuration Environment
      3.1 Transmitting Hostname Information Using Enhanced Neighbor Discovery
      3.2 Tracking Hostnames based on Enhanced Neighbor Discovery
      3.3 Enhanced Querying Mechanism for Centralized Servers in a Stateless Configuration Environment
   4.0 Implementation Mechanisms—Hardware Overview
   5.0 Extensions and Alternatives
   1.0 General Overview Techniques for determining or learning hostnames are described. "Learning," in this sense, refers to a first network device obtaining, determining or otherwise discovering a hostname of a second network device that was previously unavailable to the first network device. In an embodiment, a solicitation message, which includes a hostname for a second network device, is received at a first network device. Based on the solicitation message, the first network device determines the hostname for the second network device. A first network address is also determined for the second network device. A mapping between the hostname and the first network address is stored at the first network device.

In one embodiment, the solicitation message is received as part of a duplicate address detection (DAD) process for determining whether a tentative address generated by the second network address during stateless address autoconfiguration (SLAAC) is already in use by another network device.

In one embodiment, the first device generates an advertisement message before receiving the solicitation message. The advertisement message includes a request for a hostname of the second network device. In response to the advertisement message, the second network device generates the solicitation message that includes the hostname.

In one embodiment, the first network device receives a second network address for the second network device. In response, the hostname is mapped to the second network address such that the hostname of the second network device is mapped to both the first network address and the second network address.

In one embodiment, the first network device is a router, the second network device is a host, and the network address is a global Internet Protocol version six (IPv6) address. In an embodiment, the mapping between the hostname and the first network address are stored in a database that is local to the router. The router sends the mapping information to a name server of the Domain Name System (DNS). In yet another embodiment, the router maintains lease information for the first network address. In response to receiving a leasequery message from a Dynamic Host Configuration Protocol (DHCP) server, the router sends the lease information to the DHCP server.

In an embodiment, the solicitation message is a neighbor solicitation message. In another embodiment, the solicitation message is a router solicitation message.

In other embodiments, the invention encompasses a computer apparatus and a computer-readable medium configured to carry out the foregoing steps.

2.0 Structural and Functional Overview

According to examples provided herein, routers dynamically learn hostnames based on neighbor discovery and SLAAC usage on hosts. In one embodiment, Neighbor Discovery (ND) logic is enhanced on both hosts and routers such that the host includes its hostname in Neighbor and/or Router Solicitation messages. The host may generate the solicitation messages by default or as instructed by a router. Based on the solicitation messages, a router determines and stores hostname to IPv6 address mappings for a SLAAC client.

In an embodiment, the router sends the local database information to a designated backend server. In response, the designated backend server may store the received information for further operational usage. Thus, SLAAC client hostnames become available in a centralized server without requiring the host devices and routers to support DHCPv6 or other configuration protocols and without requiring the presence of a stateful configuration server.

Accordingly, a network bottleneck is reduced because hosts can configure themselves without reliance on a centralized server and with minimal implementation of network protocols. In addition, network operators can manage host devices using their hostname, which achieves similar manageability to other configuration protocols, such as DHCPv6, without incurring the aforementioned overhead of implementing a stateful configuration server.

FIG. 1 illustrates a typical network arrangement on which an embodiment may be implemented. Referring to FIG. 1, hosts 120*a* to 120*n* are communicatively coupled to router 140 through link 130. Hosts 120*a* to 120*n* are network devices that implement IPv6. For example, hosts 120*a* to 120*n* may include a workstation, desktop computer, a laptop computer, a tablet computer, a mobile phone such as a smartphone, a personal digital assistant (PDA), printer, multifunction peripheral, or any other end station computing device capable of implementing IPv6 that is not a router.

One or more of hosts 120*a* to 120*n* includes SLAAC client logic 122, which may be implemented in software or a combination of hardware and software. SLAAC client logic 122 enables stateless automatic address configuration of hosts according to techniques described in RFC 4862. In one embodiment, SLAAC client logic 122 includes enhanced neighbor discovery logic. Accordingly, SLAAC client logic 122 generates and sends neighbor discovery messages including a hostname for the host device. For example, SLAAC client logic 122 may include a hostname for host 120*a* in Neighbor Solicitation and/or Router Solicitation messages that host 120*a* sends over link 130.

Link 130 is a communication facility or medium over which network devices 120*a* to 120*n* and router 140 can communicate at the link layer. Examples include, but are not limited to, Ethernets; Point-to-Point Protocol (PPP) links; X.25, Frame Relay, or Asynchronous Transfer Mode (ATM) networks; and Internet or higher layer "tunnels", such as tunnels over IPv4 or IPv6.

Router 140 is any computing device that forwards IP packets not explicitly addressed to it. For example, router 140 may forward IPv6 packets received from network 150 to hosts 120*a* to 120*n* and forward IPv6 packets received from hosts 120*a* to 120*n* to other network nodes in network 150. Router 140 includes discovery logic 142, which may be implemented in software or a combination of software and hardware. Discovery logic 142 determines hostnames of SLAAC clients based on neighbor discovery messages received from one or more of hosts 120*a* to 120*n*. For example, router 140 detects solicitation messages sent over link 130. Based on the detected solicitation messages, router 140 determines a hostname and one or more IP addresses for a host's interface. In one embodiment, router 140 stores mappings between hostnames and IPv6 addresses that it determines from the solicitation messages and stores the mappings for the SLAAC clients in a local database. In an embodiment, IPv6 addresses stored in the local database for each hostname are cumulative. That is, a host device and corresponding hostname may have multiple IPv6 addresses assigned, and router 140 maps the hostname to each corresponding address.

In one embodiment, router 140 is communicatively coupled to server 160 through network 150. Network 150 may comprise one or more public networks, such as the Internet, and/or one or more private networks, such as a Local Area Network (LAN). Router 140 sends, via network 150, configuration information from its local database to server 160 for further operational usage. Router 140 may send the hostname to IP address mappings to server 160 by using either the Dynamic Domain Name System (DDNS) or the DHCP protocol. In one embodiment, router 140 bulk notifies the servers about the address and hostname assignments to several hosts. Bulk notification may further reduce the load on server 160 by minimizing and compacting communications to server 160. In a typical scenario, where server 160 services hundreds of thousands of hosts and thousands of routers, the reduced load would be considerable.

Server 160 stores the configuration information received from router 140. In one embodiment, server 160 is a name server of the Domain Name System (DNS). Accordingly, router 140 sends mapping information to server 160 using Dynamic Domain Name System (DDNS) messages. In another embodiment, server 160 may be a DHCP server. Accordingly, router 140 sends the mapping information to server 160 using DHCP messages. In other embodiments, server 160 may be a Network Management System (NMS) or a Lawful Interception (LI) System.

3.0 Dynamic Hostname Learning in a Stateless Configuration Environment 3.1 Transmitting Hostname Information using Enhanced Neighbor Discovery In examples provided herein, hosts are configured to transmit hostname information using neighbor discovery messages. In one embodiment, the IPv6 Neighbor Discovery (ND) logic, such as described in RFC 4861 of the IETF, is enhanced on hosts to include hostnames in neighbor discovery messages generated and sent by the host. In an embodiment, the hostname is included in one or more Router and/or Neighbor Solicitation (RS or NS) messages sent by the host device. For example, the message format for Internet Control Message Protocol (ICMP) type 133 and/or ICMP type 135 may be configured to include a "hostname" field, which includes the hostname of the sending node.

Hosts may generate and send solicitation messages by default during SLAAC or as instructed by the router. In an embodiment, one or more solicitation messages including the hostname are sent by default during the duplicate address detection process, which occurs prior to site or global unicast IPv6 address assignment in SLAAC. The number, timing, and frequency of the messages may vary from implementation to implementation. In another embodiment, a host sends solicitation messages including the hostname in response to a Router Advertisement (RA) message requesting the hostname. The RA message may be sent at any time during the SLAAC process. In response to receiving the RA message, the host sends one or more solicitation messages including the hostname.

Figure 2:
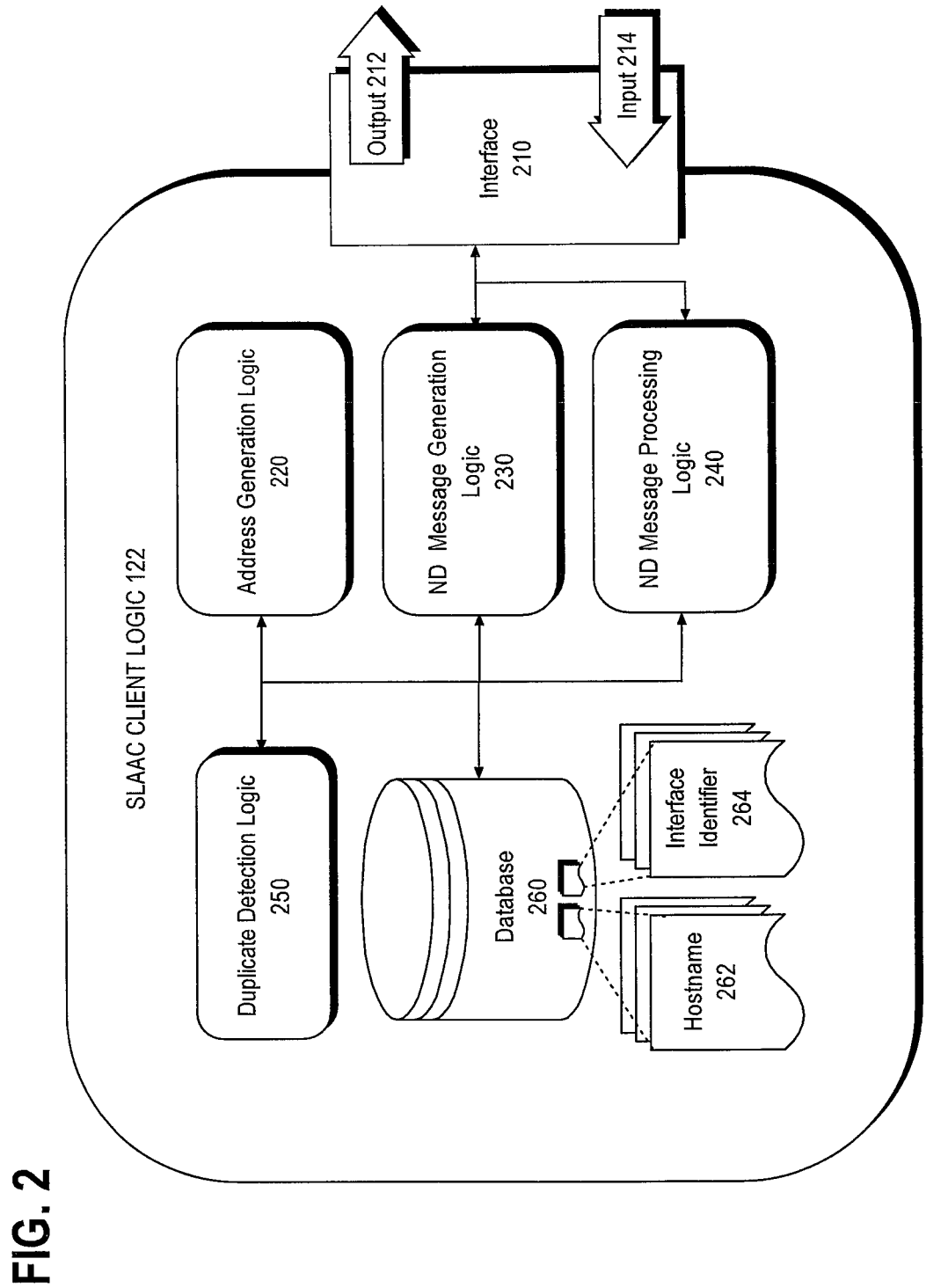
FIG. 2 illustrates SLAAC client logic in accordance with an embodiment.

FIG. 2 is a block diagram that illustrates SLAAC client logic 122 of FIG. 1 in greater detail, according to an embodiment. Referring to FIG. 2, input 214 is received by SLAAC client logic 122 at interface 210. Interface 210 is a host's attachment to link 130 and may be a wireless or wired link. As an example, interface 210 may include a network interface controller and interface logic to parse and distribute incoming data and send outgoing data via interface 210. Interface logic may also implement communication protocols to enable communication with other nodes over link 130.

In one embodiment, input 214 includes neighbor discovery messages sent by other nodes on link 130. For example, input 214 may be a Neighbor Advertisement (NA) or NS message sent by another host or an RA message sent by router 140. In an embodiment, output 212 includes NS and/or RS messages generated by ND message generation logic 230.

Interface 210 is coupled to ND message generation logic 230 and ND message processing logic 240. ND message generation logic 230 generates NS, RS and/or NA messages for transmission via interface 210 to other nodes on link 130. ND message processing logic 240 processes incoming neighbor discovery messages received via interface 210 that are sent by other nodes on link 130. Processing of the ND messages may be performed in accordance with RFC 4861, RFC 4862, and techniques described further herein.

SLAAC client logic 122 includes address generation logic 220 for automatically generating network addresses, such as link-local and global addresses, for interface 210. Address generation logic 220 automatically generates the address according to techniques described in RFC 4862. For example, address generation logic 220 generates a tentative link-local address by appending interface identifier 264, which is retrieved from database 260, to the well-known link-local prefix. If the tentative link-local address is determined to be unique by duplicate detection logic 250, then the link-local address is assigned to interface 210, and address generation logic 220 generates a global unicast IPv6 address for interface 210 by appending interface identifier 264 to a prefix of appropriate length, which is obtained from RA messages received by SLAAC client logic 122. The global IPv6 address is subsequently assigned to the interface. Duplicate address detection may also be performed on the global address before it is assigned.

SLAAC client logic 122 includes duplicate detection logic 250. After address generation logic 220 generates an address, duplicate detection logic verifies the uniqueness of the address before it is assigned to interface 210. Duplicate detection logic 250 uses ND message generation logic 230 to generate solicitation messages that include the tentative address to be verified. In one embodiment, one or more solicitation messages that are generated as part of Duplicate Address Detection (DAD) include hostname 262, which is retrieved from database 260. During DAD, duplicate detection logic 250 compares the tentative addresses to addresses included in NS or NA messages received from other nodes on link 130. If the tentative address is not included in NS or NA messages from other nodes, then the tentative address is determined to be unique, and duplicate detection logic 250 assigns the tentative address to interface 210. Otherwise, manual configuration is required or a different interface identifier is selected and the process of DAD is repeated for the newly selected interface identifier.

Database 260 is coupled to one or more logic blocks illustrated in SLAAC client logic 122. Database 260 stores information, including hostname 262 and interface identifier 264, which is used by SLAAC client logic 122 during the configuration process. Interface identifier 264 is a bit string of predefined length and may be based on a hardware address, such as a Media Access Control (MAC) address.

ND message generation logic 230 generates ND messages for transmission via interface 210. In an embodiment, ND message generation logic 230 generates NS messages that include hostname 262 during DAD as directed by duplicate detection logic 250. In another embodiment, ND message generation logic 230 generates NS and/or RS messages that include hostname 262 in response to a RA message, as directed by ND message processing logic 240. In yet another embodiment, ND message generation logic 230 generates RS messages including hostname 262 to request network prefix information from the router.

Figure 4:
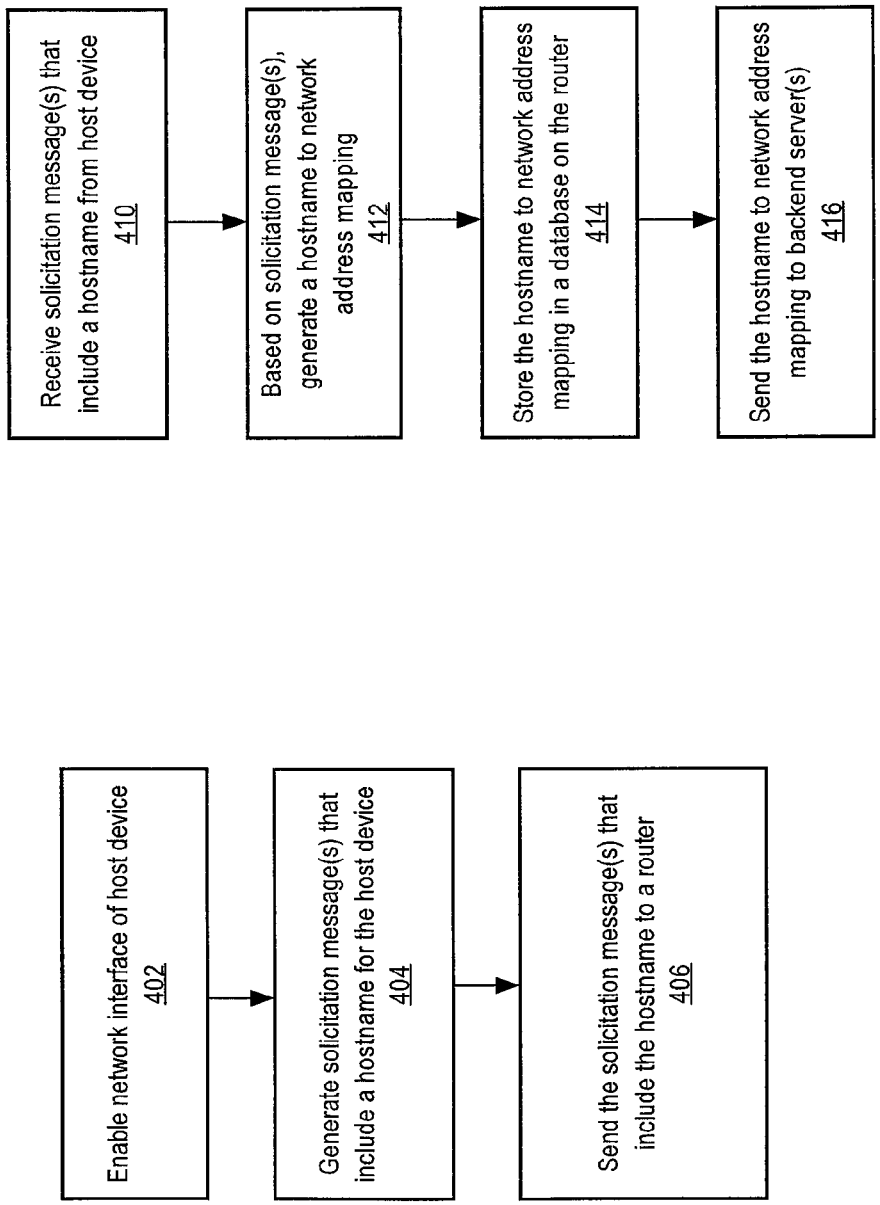
FIG. 4A illustrates an approach for transmitting hostname information during SLAAC in accordance with an embodiment.
FIG. 4B illustrates an approach for tracking hostnames based on SLAAC usage of hosts in accordance with an embodiment.

FIG. 4A illustrates an approach for transmitting hostname information during a stateless autoconfiguration process in accordance with an embodiment. In block 402 a network interface of a host device is enabled. For example, the network interface may be enabled during system startup, after a temporary failure, after being temporarily disabled by system management, or upon attachment to a link for the first time. After the interface is enabled, SLAAC of the interface begins.

In block 404, one or more solicitation messages that include a hostname for the network interface are generated during SLAAC. If the hostname subsequently changes, the host may generate an additional RS and/or NS message to notify the router of the change.

In block 406 the solicitation messages that include the hostname are sent to the router. In one embodiment, sending the messages to the router comprises multicasting the messages over a link to a group of nodes that includes the router. For example, NS messages may be sent to the all-nodes or solicited-nodes multicast group, and RS messages may be sent to the all-routers multicast group. Alternatively, the solicitation messages may be explicitly addressed to a router.

In an example SLAAC process, a SLAAC client generates a tentative link-local address when its interface becomes enabled. The SLAAC client performs DAD by sending NS messages to the solicited-nodes multicast group of the tentative link-local address. In one embodiment, these NS messages include the hostname for the SLAAC client. If the tentative link-local address is unique, i.e., no other node on the link is using the address, then it is assigned to the host's interface. Otherwise, the process repeats for a different tentative link-local address or manual configuration is required. In order to generate a global address, the SLAAC client requests RA messages that include a network prefix by sending RS messages to the all-routers multicast group. In one embodiment, these RS messages include the hostname for the SLAAC client. In response, the router sends an RA message including a network prefix. The SLAAC client uses the network prefix to generate a global IPv6 address. Accordingly, host devices leverage NS and/or RS solicitation messages, generated during SLAAC, to transmit their hostnames.

3.2 Tracking Hostnames Based on SLAAC Usage on Host

In order to dynamically learn hostnames of SLAAC clients, routers are configured to track hostname information based on neighbor discovery messages. In one embodiment, the IPv6 Neighbor Discovery (ND) logic, such as described in RFC 4861 of the IETF, is enhanced on routers to extract and store hostname information included in neighbor discovery messages. For example, the router may process RS and/or NS messages sent by the host device to determine the hostname and a network address for the host device. After the router determines the hostname and network address, the router generates and stores a hostname to network address mapping in a local database. This information may subsequently be transferred to a server to provide a centralized platform from which network managers can manage network devices.

Figure 3:
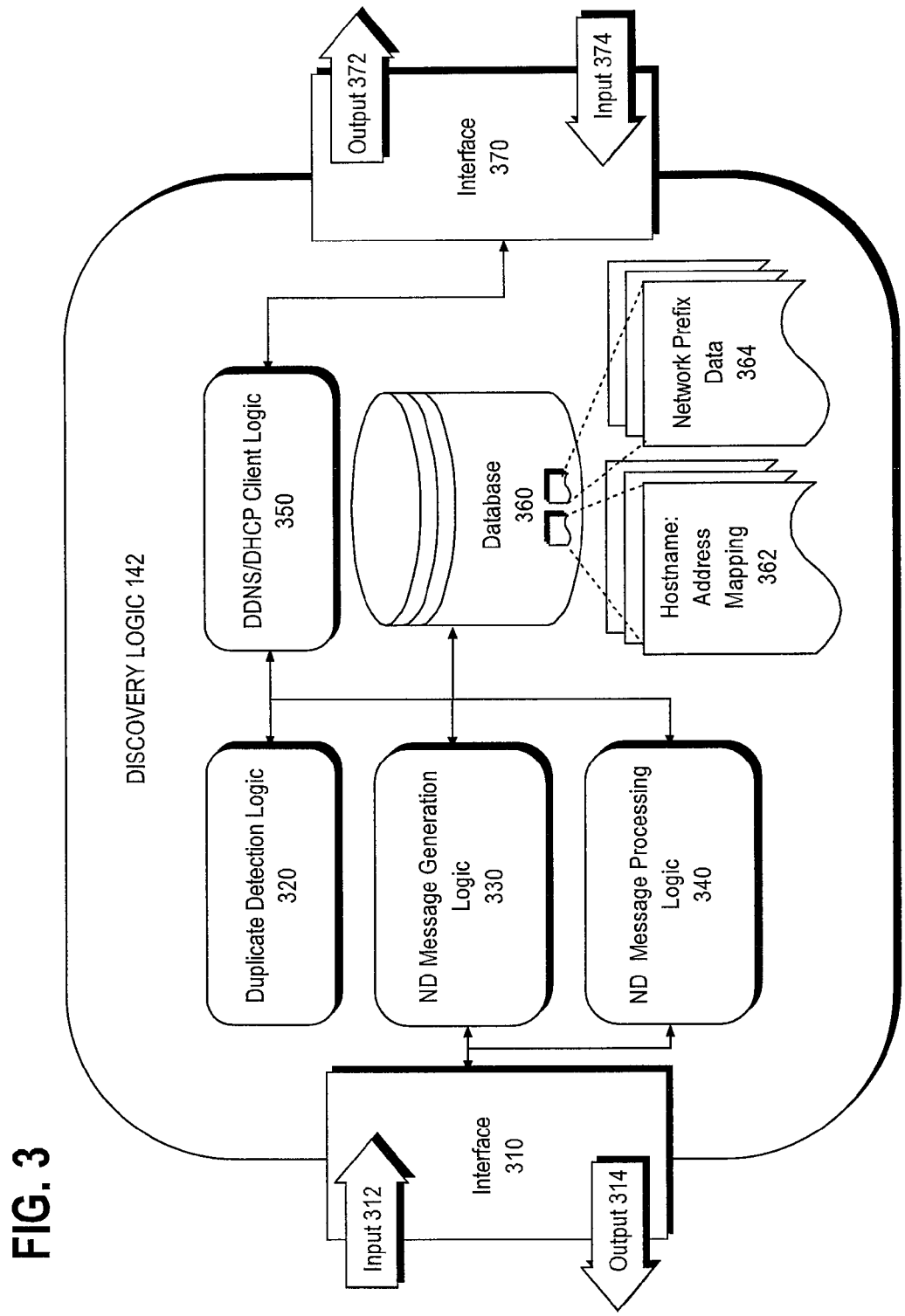
FIG. 3 illustrates discovery logic in accordance with an embodiment.

FIG. 3 illustrates discovery logic according to an embodiment. Referring to FIG. 3, discovery logic 142 includes interface 310, which is the router's attachment to link 130. Router 140 receives input 312 from other nodes on link 130 and sends output 314 to other nodes on link 130 via interface 310. In one embodiment, input 312 includes ND messages, such as NS and/or RS messages, sent by host devices over link 130.

Interface 310 is coupled to ND message generation logic 330 and ND message processing logic 340. ND message generation logic 330 generates RA messages for transmission via interface 310 to hosts on link 130. In one embodiment the RA messages include enhanced RA messages that include requests for hostnames. For example, the message format for ICMP type 134 may be updated to include a field indicating a hostname request. In response to receiving the RA, the host sends a solicitation message, which includes the hostname, to the router. ND message generation logic 330 also generates RA messages that include network prefix data 364 either periodically, or as instructed by a host, such as in response to a RS message. The host device uses network prefix data 364 to generate a global unicast IPv6 address, according to techniques described in RFC 4862.

ND message processing logic 340 processes incoming neighbor discovery messages received via interface 310 that are sent by other nodes on link 130. Processing of the ND messages may be performed in accordance with RFC 4861, RFC 4862, and techniques described further herein. In an embodiment, ND processing logic 340 parses the received solicitation messages to determine a hostname and an IPv6 address for the sending SLAAC client. Based on this determination, ND message processing logic 340 generates or updates hostname to address mapping data 362 and stores it in database 360.

In one embodiment, discovery logic 142 includes duplicate detection logic 320. Duplicate detection logic 320 determines whether two hosts are using the same hostname based on the enhanced solicitation messages and the hostname data stored in database 360. For example, ND message processing logic 340 may pass a hostname from a received solicitation message to duplicate detection logic 320. Duplicate detection logic 320 searches hostname:address mapping data 362 for a matching hostname. If the matching hostname is being used by a different host, than duplicate detection logic 320 logs or raises an alarm to address collision issues.

In one embodiment, discovery logic 142 includes DDNS and/or DHCP client logic 350 for transmitting hostname to address mapping information to a backend server. DDNS/DHCP client logic 350 is coupled to interface 370, which is the routers attachment to network 150. DDNS/DHCP client logic 350 sends DDNS and/or DHCP messages via output 372. DDNS/DHCP client logic receives messages from the backend server via input 374 on interface 370. For example, input 374 may include enhanced LEASEQUERY messages, which are described further below.

FIG. 4B illustrates an approach to tracking hostnames in accordance with an embodiment. In block 410, one or more solicitation messages that include a hostname are received from the host device. In block 412, a hostname to network address mapping is generated based on the received solicitation messages. In block 414, the hostname to network address mapping is stored in a database on the router. In block 416, the hostname to network address mapping is sent to a centralized server.

Frequently, a hostname for a single host may have multiple IPv6 addresses assigned to it. In such a scenario, the router maps the hostname to each IP address for the host device. For example, a host may assign one IPv6 address for video data, another IPv6 address for voice data, and a third IPv6 for other data. When configuring its interface according to SLAAC, the host will send a separate solicitation message to perform DAD for each IPv6 address that the host chooses. In one embodiment, each separate solicitation message includes a hostname for the corresponding IPv6 address. The hostname may be the same or different for each IPv6 address. In the scenario where the same hostname is used for multiple addresses of a single host, the IPv6 addresses are stored cumulatively on the router. Thus, the router would store an initial hostname to IPv6 address mapping. For each additional IPv6 address, an additional entry would be created in the router's database. Thus, the hostname would map to every IPv6 address assigned to the host's interface.

In an embodiment, the router updates database entries for a host based on subsequent NS or RS messages received from the host. For example, if the hostname changes for a host, the hostname generates and sends new NS and/or RS messages reflecting the change. In response, the router updates the hostname to network address mappings by replacing or deleting the outdated hostname.

In order to update the centralized server, new or existing message options may be used to transmit the IP address binding information. For example, DDNS specifies existing message options for routers to notify DNS name servers to dynamically change their active DNS configuration of the configured hostnames and corresponding addresses. The router may leverage existing DDNS messages to update the DNS server in real-time as SLAAC clients automatically configure their interfaces. In addition or as an alternative to generating DDNS messages, the router may generate DHCP messages. In one embodiment, the router generates a new DHCP message option, which encodes the hostname on a per host or per address basis. Accordingly, DHCP servers are configured to extract and store hostname to IPv6 address mappings based on the new DHCP message option. Like the DDNS message option, the DHCP messages may be sent in real-time as SLAAC clients configure their interfaces. Thus, each message includes one hostname to IPv6 address mapping as the information becomes available to the router.

Alternatively, the router may bulk notify the centralized server of several hostname to IPv6 address mappings. Thus, a new DDNS and/or DHCP message option may be used to encode a plurality of hostname to IPv6 address mappings in a single message. The receiving server processes the message to determine the plurality of hostname to IPv6 address mappings, which it may subsequently store in its own database. Bulk notification may reduce network overhead by compacting server update messages, especially when the server is communicating with a large number of routers.

3.3 Enhanced Querying Mechanism for Centralized Servers in a Stateless Configuration Environment Traditionally, stateful configuration servers, such as DHCP servers, maintain authoritative information relating to the IP addresses that it has leased to its clients. In order to gather information about IP address bindings, routers typically query the centralized server using a querying mechanism. For example, DHCPv4 and DHCPv6 specify a LEASEQUERY message in RFC 4388 and RFC 5007, respectively. The LEASEQUERY message is sent by the router to the DHCP server in order to determine the endpoint location of an IP address and its remaining lease. An appropriately configured DHCP server responds with information regarding the location of the IP address, if known, and leasing information for the IP address. For example, the DHCP server may respond with a DHCPLEASEUNASSIGNED, DHCPLEASEACTIVE, or DHCPLEASEUNKOWN message depending on whether there is a known, active lease on the IP address. Thus, routers may dynamically determine the status of an IP address binding from the DHCP server by using LEASEQUERY messages.

In a stateless configuration environment, a centralized server may not maintain authoritative information relating to IPv6 addresses because SLAAC clients do not report to centralized servers. Therefore, the need may arise for the centralized server to dynamically determine this information from other network nodes.

According to embodiments described above, routers are configured to maintain up-to-date information about IPv6 address bindings by extracting the information from solicitation messages sent by SLAAC clients during autoconfiguration. In an embodiment, the routers may also be configured to maintain lease information for each IPv6 address. For example, the router may store data indicating a lease interval for each IPv6 address. After the lease interval expires, the address becomes deprecated. The lease interval may be based on the preferred address lifetime, as described in RFC 4862.

The information maintained by the routers according to the techniques described above may be used to dynamically update centralized servers upon the server's request. In order to access the information concerning IP addresses maintained by the routers, a querying mechanism may be implemented on the centralized server.

According to one embodiment, a centralized server queries one or more routers for lease information by generating and sending LEASEQUERY messages. The LEASEQUERY messages may mirror the DHCPLEASEQUERY described in RFC 4388 and RFC 5007, except that the DHCP server generates and sends the messages instead of receiving and processing the messages. In response to the LEASEQUERY message, the router sends the requested information. For example, the router may send a message indicating whether an IPv6 address is known, the endpoint location of an IPv6 address, and/or lease information for the IPv6 address. Thus, the functionality of DHCP servers may be extended to obtain leasing and/or location information from routers when needed by issuing leasequeries.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
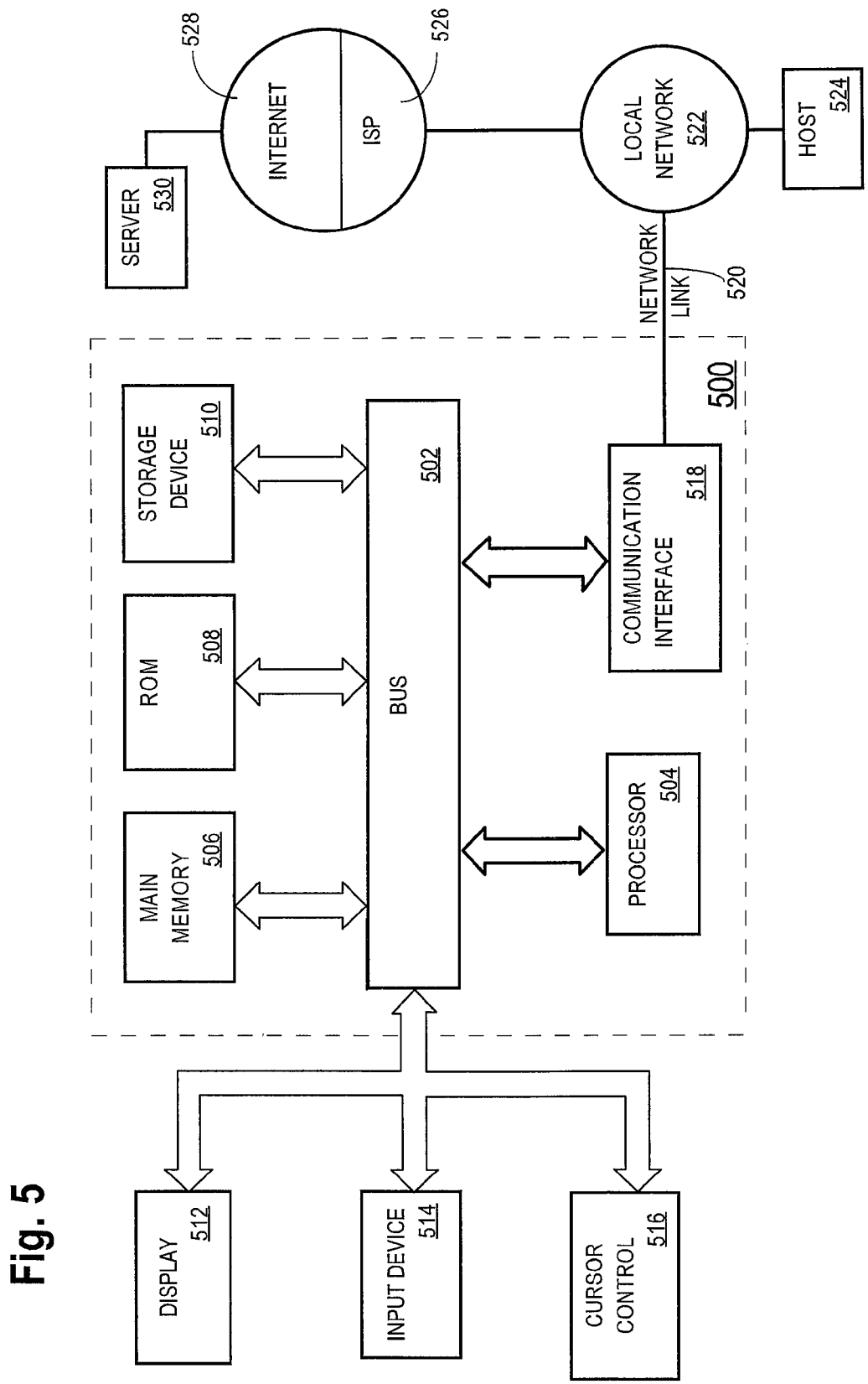
FIG. 5 illustrates a computer system upon which an embodiment may be implemented

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), liquid crystal display (LCD), or light emitting diode (LED) display, for displaying information to a computer user. An input device 514 is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Figure 6:
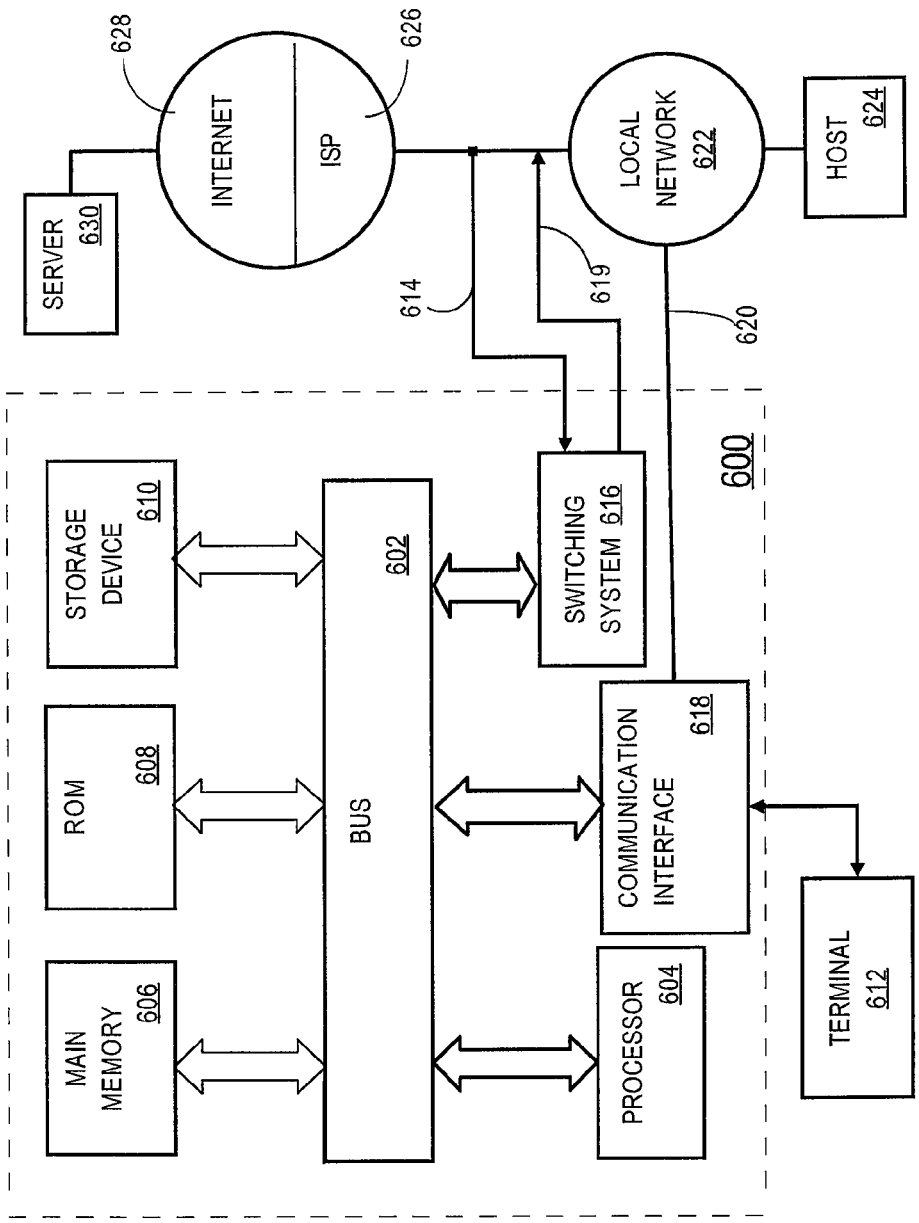
FIG. 6 illustrates a router computer system upon which an embodiment may be implemented

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

According to one embodiment of the invention, techniques for dynamically learning hostnames of hosts based on solicitation messages are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. One such downloaded application provides for dynamically learning hostnames as described herein.

The received code may be executed by processor 604 as it is received, and/or stored in storage device 610, or other non-volatile storage for later execution. In this manner, computer system 600 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising;
receiving, at a first network device during a duplicate address detection process of a stateless address autoconfiguration (SLAAC) for a second network device, a solicitation message that includes a hostname for the second network device;
determining, at the first network device and based on the solicitation message received during the SLAAC of the second network device, the hostname for the second network device;
determining a first network address for the second network device that sent the solicitation message;
storing, at the first network device, a mapping between the hostname and the first network address for the second network device;
receiving a second network address for the second network device;
storing, at the first network device, a mapping between the hostname and the second network address for the second network device;
wherein the hostname of the second network device is mapped to both the first network address and the second network address.

2. The method of claim 1, wherein the duplicate address detection (DAD) process determines whether a tentative address generated by the second network device during the SLAAC is already in use by another network device.

3. The method of claim 1, the method further comprising: generating an advertisement message at the first device before the solicitation message is received; wherein the advertisement message requests a hostname from the second network device; wherein the second network device generates the solicitation message in response to the advertisement message.

4. The method of claim 1, wherein the first network device is a router and wherein the first network address of the second network device is a global Internet Protocol version six (IPv6) address.

5. The method of claim 4, wherein the mapping between the hostname and the first network address are stored in a database that is local to the router; the method further comprising: sending the mapping from the router to a name server of the Domain Name System (DNS).

6. The method of claim 4, further comprising: maintaining lease information for the first network address at the router; in response to receiving a leasequery message from a Dynamic Host Configuration Protocol (DHCP) server, sending the lease information for the first network address to the DHCP server.

7. The method of claim 1, wherein the solicitation message is a neighbor solicitation message.

8. The method of claim 1, wherein the solicitation message is a router solicitation message.

9. A non-transitory computer-readable medium storing instructions, which, when executed by one or more processors, cause performance of;
   receiving, at a first network device during a duplicate address detection process of a stateless address autoconfiguration (SLAAC) of a second network device, a solicitation message that includes a hostname for a second network device;
   determining, at the first network device and based on the solicitation message received during the SLAAC of the second network device, the hostname for the second network device;
   determining a first network address for the second network device that sent the solicitation message;
   storing, at the first network device, a mapping between the hostname and the first network address for the second network device;
   receiving a second network address for the second network device;
   storing, at the first network device, a mapping between the hostname and the second network address for the second network device;
   wherein the hostname of the second network device is mapped to both the first network address and the second network address.

10. The non-transitory computer-readable medium of claim 9, wherein the duplicate address detection (DAD) process determines whether a tentative address generated by the second network device during the SLAAC is already in use by another network device.

11. The non-transitory computer-readable medium of claim 9, the instructions further causing performance of: generating an advertisement message at the first device before the solicitation message is received; wherein the advertisement message requests a hostname from the second network device; wherein the second network device generates the solicitation message in response to the advertisement message.

12. The non-transitory computer-readable medium of claim 9, wherein the first network device is a router and wherein the first network address of the second network device is a global Internet Protocol version six (IPv6) address.

13. The non-transitory computer-readable medium of claim 12, wherein the mapping between the hostname and the first network address are stored in a database that is local to the router; the instructions further causing performance of: sending the mapping from the router to a name server of the Domain Name System (DNS).

14. The non-transitory computer-readable of claim 12, the instructions further causing performance of: maintaining lease information for the first network address at the router; in response to receiving a leasequery message from a Dynamic Host Configuration Protocol (DHCP) server, sending the lease information for the first network address to the DHCP server.

15. An apparatus comprising;
   one or more processors;
   one or more stored sequences of instructions which, when executed by the one or more processors, cause the apparatus to perform:
   receiving, at the apparatus during a duplicate address detection process of a stateless address autoconfiguration (SLAAC) for a second network device, a solicitation message that includes a hostname for the second network device;
   determining, at the apparatus and based on the solicitation message received during the SLAAC of the second network device, the hostname for the second network device;
   determining a first network address for the second network device that sent the solicitation message;
   storing, at the apparatus, a mapping between the hostname and the first network address for the second network device
   receiving a second network address for the second network device;
   storing, at the apparatus, a mapping between the hostname and the second network address for the second network device;
   wherein the hostname of the second network device is mapped to both the first network address and the second network address.

16. The apparatus of claim 15, wherein the duplicate address detection (DAD) process determines whether a tentative address generated by the second network device during the SLAAC is already in use by another network device.

17. The apparatus of claim 15, the instructions further causing the apparatus to perform: generating an advertisement message at the apparatus before the solicitation message is received; wherein the advertisement message requests a hostname from the second network device; wherein the second network device generates the solicitation message in response to the advertisement message.

* * * * *